(No Model.)
W. R. FOX.
MILLING MACHINE.
No. 483,838. Patented Oct. 4, 1892.
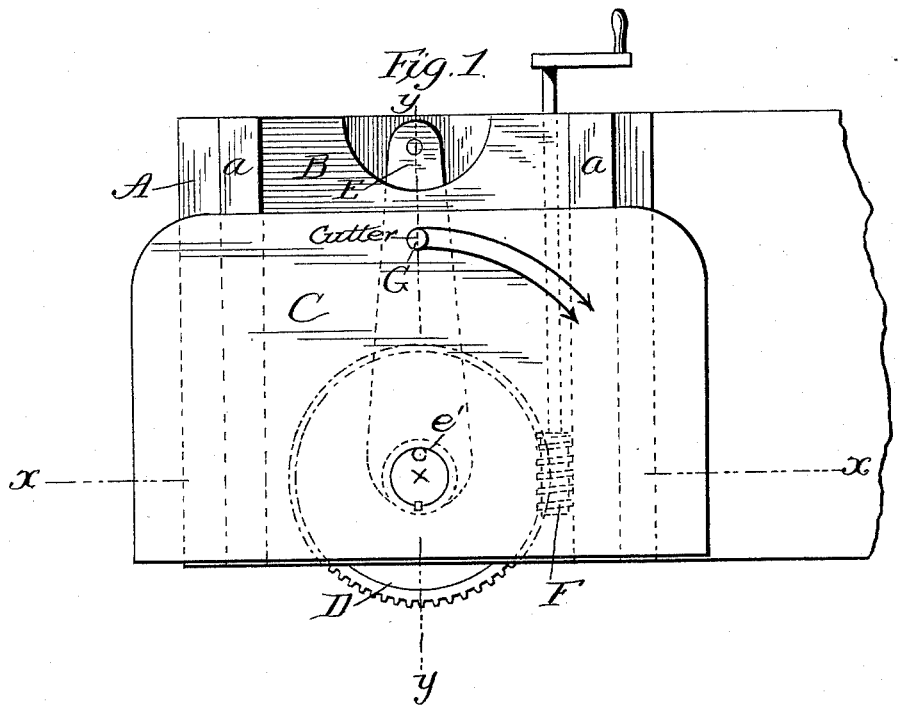
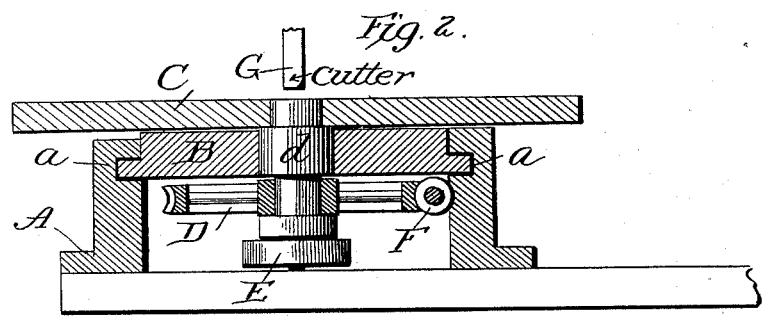
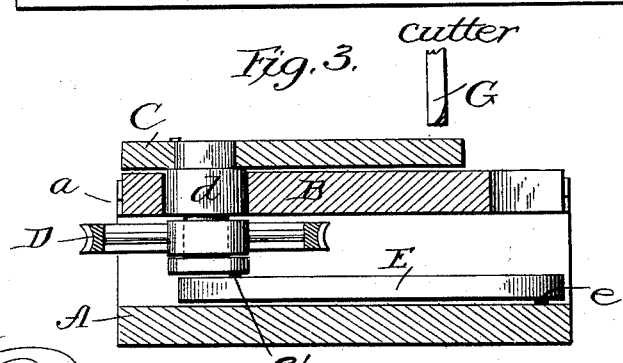
Attest
Walter Donaldson
F. L. Middleton
Inventor
William R. Fox
by Elis Spear
Atty.

UNITED STATES PATENT OFFICE.

WILLIAM R. FOX, OF GRAND RAPIDS, MICHIGAN, ASSIGNOR TO THE FOX MACHINE COMPANY, OF SAME PLACE.

MILLING-MACHINE.

SPECIFICATION forming part of Letters Patent No. 483,838, dated October 4, 1892.

Application filed February 8, 1892. Serial No. 420,665. (No model.)

*To all whom it may concern:*

Be it known that I, WILLIAM R. FOX, a citizen of the United States of America, residing at Grand Rapids, in the county of Kent and State of Michigan, have invented certain new and useful Improvements in Milling-Machines, of which the following is a specification.

My invention is a milling-frame designed to be used in cutting slots other than circular in bed-plates or the like.

In the accompanying drawings, Figure 1 is a plan view of the machine. Fig. 2 is a section on line $xx$ of Fig. 1. Fig. 3 is a section on line $yy$ of Fig. 1.

The work-holding plate C is carried on the upper end of an arbor $d$ above the plate B. The arbor is journaled in this table to have rotary movement, and when turned by means of the worm-wheel D, fixed thereon below the table, and a worm-shaft F, the said arbor will turn the plate C, holding the work, imparting a rotary movement thereto to bring different parts thereof to the cutter G for forming the slot. During this rotary movement the arbor with the plate C is moved toward the cutter and this linear movement is effected by mounting the arbor in the table B, before mentioned, which table in turn is mounted to reciprocate below the cutter in the guideways $a$ of the main frame, and this movement is secured by the link E, pivoted by a stationary pin $e$, to the bed of the machine at one end and at the other end to the pin $e'$, arranged eccentrically on the lower end of the arbor. It will thus be seen that as the point $e$ is fixed the rotary movement of the arbor will through the eccentric-pin $e'$ and link E cause the table to be drawn backward and forward under the cutter, thus moving the work in a linear direction below the cutter while it is also rotated. When the plate is in the position shown in Fig. 1, so that a straight line drawn through the actual center $x$ of the arbor and the eccentric-pin $e'$ strikes the center of the milling-tool, the tool is then at the greatest distance from the center of the plate, and as the plate C is turned in either direction the table-carriage B is moved longitudinally toward the tool, and the distance between the tool and the center of the plate and arbor is thereby shortened. The tool is thus made to work upon a curve, as shown by the arrows, Fig. 1, varying from the arc of a circle, and the amount of this variation depends upon the eccentricity of the pin at the lower end of the arbor or the distance thereof from the actual center of the arbor, which, as before stated, is the actual center of rotation of the work-holding plate. The curve of the slot which results from this combined rotary and longitudinal movement of the plate is such as would be formed by striking a curve from the center of the arbor with a constantly-shortening radius.

The milling-tool may be of any approved form and operated in any desired manner.

I claim as my invention—

1. In combination, the tool, the rotary holder for the work, the movable support therefor, the means for rotating the holder, and an independent drawing connection operated by the rotary movement of the holder for moving the holder with its movable support toward and from the tool, said drawing connection extending in the line of the longitudinal movement of the holder toward and from the tool, substantially as described.

2. In combination, the tool, the rotary work-holder, the reciprocating support therefor, the means for giving the initial movement and rotating the holder in its support, and an independent drawing connection operated positively by the rotary movement of the holder for reciprocating the work-holder, substantially as described.

3. In combination, the arbor $d$, the guiding means therefor to direct its movement toward the milling-tool, the means for rotating the arbor, and the link E, pivoted to the frame and eccentrically to the arbor, substantially as described.

4. In combination, a plate, as C, mounted upon a sliding table, the bed supporting the table, an arbor on which the plate is fixed, mechanism for turning the arbor, and a connection between the arbor and the bed arranged eccentrically of the pivotal line of the plate, substantially as described.

In testimony whereof I affix my signature in presence of two witnesses.

WILLIAM R. FOX.

Witnesses:
JOHN DUFFY,
BESSIE JONES.